US009071587B2

(12) United States Patent
Heninger et al.

(10) Patent No.: US 9,071,587 B2
(45) Date of Patent: Jun. 30, 2015

(54) OPTIMIZING DEPLOYMENT OF VIRTUAL MACHINES BY PRE-GENERATING A VIRTUAL MACHINE'S FIRST-BOOT METADATA BY CLOUD CONTROLLER

(75) Inventors: Ivan M. Heninger, Selma, NC (US); Douglas A. Larson, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/595,352

(22) Filed: Aug. 27, 2012

(65) Prior Publication Data

US 2014/0059541 A1 Feb. 27, 2014

(51) Int. Cl.

| | |
|---|---|
| ***G06F 9/455*** | (2006.01) |
| ***H04L 29/06*** | (2006.01) |
| ***H04L 29/08*** | (2006.01) |
| ***G06F 9/445*** | (2006.01) |
| ***G06F 21/00*** | (2013.01) |

(52) U.S. Cl.

CPC .............. *H04L 63/062* (2013.01); *H04L 29/08* (2013.01); *H04L 67/34* (2013.01); *H04L 67/10* (2013.01); *H04L 63/0823* (2013.01); *H04L 63/0876* (2013.01); *G06F 8/63* (2013.01); *G06F 9/45545* (2013.01); *G06F 21/00* (2013.01); *G06F 2009/45562* (2013.01); *G06F 2009/45587* (2013.01)

(58) Field of Classification Search

None

See application file for complete search history.

(56) References Cited

U.S. PATENT DOCUMENTS

| | | | | |
|---|---|---|---|---|
| 6,370,249 | B1 * | 4/2002 | Van Oorschot | 380/277 |
| 2006/0258340 | A1 | 11/2006 | Eronen | |
| 2008/0163194 | A1 | 7/2008 | Dias et al. | |
| 2009/0006850 | A1 | 1/2009 | Birger et al. | |
| 2009/0154709 | A1 * | 6/2009 | Ellison | 380/282 |
| 2012/0131579 | A1 | 5/2012 | Pujolle et al. | |

OTHER PUBLICATIONS

Mell et al., "The NIST Definition of Cloud Computing," Special Publication 800-145, Sep. 2011.

* cited by examiner

*Primary Examiner* — Lewis A Bullock, Jr.
*Assistant Examiner* — Wynuel Aquino
(74) *Attorney, Agent, or Firm* — Robert A. Voigt, Jr.; Winstead, P.C.

(57) ABSTRACT

A method, system and computer program product for optimizing virtual machine deployment. A cloud controller pre-generates and stores a virtual machine's first-boot metadata (e.g., a RSA key) prior to the deployment of the virtual machine so that the virtual machine does not need to generate such metadata at deployment time thereby reducing the deployment time of the virtual machine. Instead, after the deployment and activation of the virtual machine, an activation agent running on the virtual machine requests the pre-generated first-boot metadata from the cloud controller. The cloud controller retrieves the requested pre-generated first-boot metadata to be transmitted to the requesting virtual machine and implements public-key cryptography so that the requesting virtual machine can verify the authenticity of the transmitted first-boot metadata. By reducing the deployment time for the virtual machine, cloud resources can be used for other activities.

15 Claims, 5 Drawing Sheets

500

PRE-GENERATE A VIRTUAL MACHINE'S FIRST-BOOT METADATA PRIOR TO DEPLOYMENT OF VIRTUAL MACHINE — 501

STORE PRE-GENERATED FIRST-BOOT METADATA ON CLOUD CONTROLLER — 502

DEPLOY VIRTUAL MACHINE — 503

TRANSMIT REQUEST FOR PRE-GENERATED FIRST-BOOT METADATA TO CLOUD CONTROLLER FROM ACTIVATION AGENT OF DEPLOYED VIRTUAL MACHINE VIA OUT-OF-BAND COMMUNICATION — 504

PROCESS REQUEST AND RETRIEVE REQUESTED PRE-GENERATED FIRST-BOOT METADATA — 505

SIGN RETRIEVED PRE-GENERATED FIRST-BOOT METADATA WITH CLOUD CONTROLLER'S PRIVATE KEY TO GENERATE A SIGNATURE — 506

TRANSMIT REQUESTED PRE-GENERATED FIRST-BOOT METADATA, THE SIGNATURE AND A CORRESPONDING PUBLIC KEY TO REQUESTING ACTIVATION AGENT OF VIRTUAL MACHINE — 507

508 SIGNATURE VERIFIED?

YES — INSTALL REQUESTED PRE-GENERATED FIRST-BOOT METADATA — 509

NO — DO NOT INSTALL REQUESTED PRE-GENERATED FIRST-BOOT METADATA — 510

OPTIMIZING DEPLOYMENT OF VIRTUAL MACHINES BY PRE-GENERATING A VIRTUAL MACHINE'S FIRST-BOOT METADATA BY CLOUD CONTROLLER

TECHNICAL FIELD

The present invention relates generally to cloud computing, and more particularly to optimizing the deployment of virtual machines by pre-generating a virtual machine's first-boot metadata (e.g., RSA key, Globally Unique IDentifier (GUID)) by the cloud controller.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

An image of the virtual operating system contains many pieces of unique metadata that are often generated on the first boot to ensure randomness and security, such as a RSA key, a Globally Unique IDentifier (GUID), a Secure Sockets Layer (SSL) certificate and a Lightweight Third-Party Authentication (LTPA) key. Currently, the virtual machine generates these metadata at deployment time. Since some of the metadata requires extensive time to generate, the deployment time of the instance of the virtual machine can be lengthy. If, however, the virtual machine can be relieved of generating such metadata, the deployment time could be lessened. As a result, instead of the cloud's limited resources being used on first-boot activities, such as generating these first-boot metadata, such resources could be used for other activities.

BRIEF SUMMARY

In one embodiment of the present invention, a method for optimizing virtual machine deployment comprises pre-generating a virtual machine's first-boot metadata prior to deployment of the virtual machine. The method further comprises storing the pre-generated first-boot metadata. Furthermore, the method comprises deploying the virtual machine. Additionally, the method comprises receiving a request from an agent of the virtual machine requesting the pre-generated first-boot metadata. The method additionally comprises retrieving the requested pre-generated first-boot metadata. Furthermore, the method comprises signing the retrieved pre-generated first-boot metadata with a private key to generate a signature. In addition, the method comprises transmitting, by a processor, a public key, the signature and the retrieved pre-generated first-boot metadata to the agent of the virtual machine.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
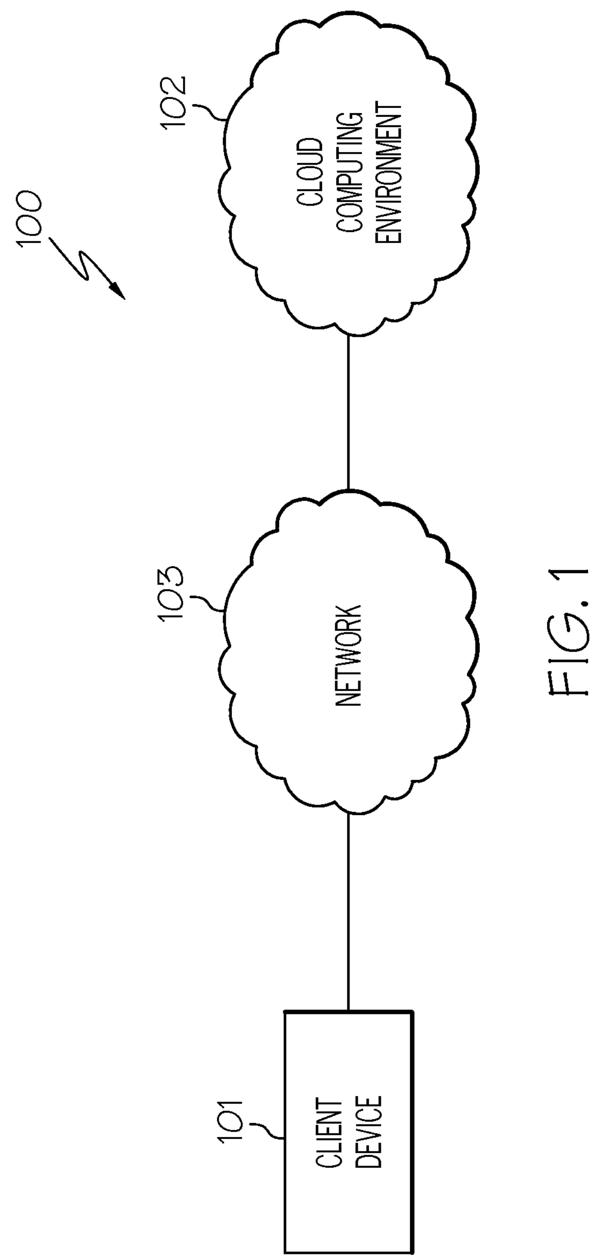
FIG. 1 illustrates a network system configured in accordance with an embodiment of the present invention.

The present invention comprises a method, system and computer program product for optimizing virtual machine deployment. In one embodiment of the present invention, a cloud controller pre-generates and stores a virtual machine's first-boot metadata (e.g., a RSA key, a GUID identifier, a SSL certificate and a LTPA key) prior to the deployment of the virtual machine so that the virtual machine does not need to generate such metadata at deployment time thereby reducing the deployment time of the virtual machine. Instead, after the deployment and activation of the virtual machine, an activation agent running on the virtual machine requests the pre-generated first-boot metadata from the cloud controller. The cloud controller retrieves the requested pre-generated first-boot metadata and signs the retrieved pre-generated first-boot metadata with a private key to generate a signature. The cloud controller transmits the requested pre-generated first-boot metadata, the signature, and a public key, corresponding to the private key used to generate the signature, to the requesting activation agent of the virtual machine thereby allowing the virtual machine to validate the authenticity and integrity of the pre-generated first-boot metadata. By reducing the deployment time for the virtual machine, cloud resources can be used for other activities.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as Follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as Follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
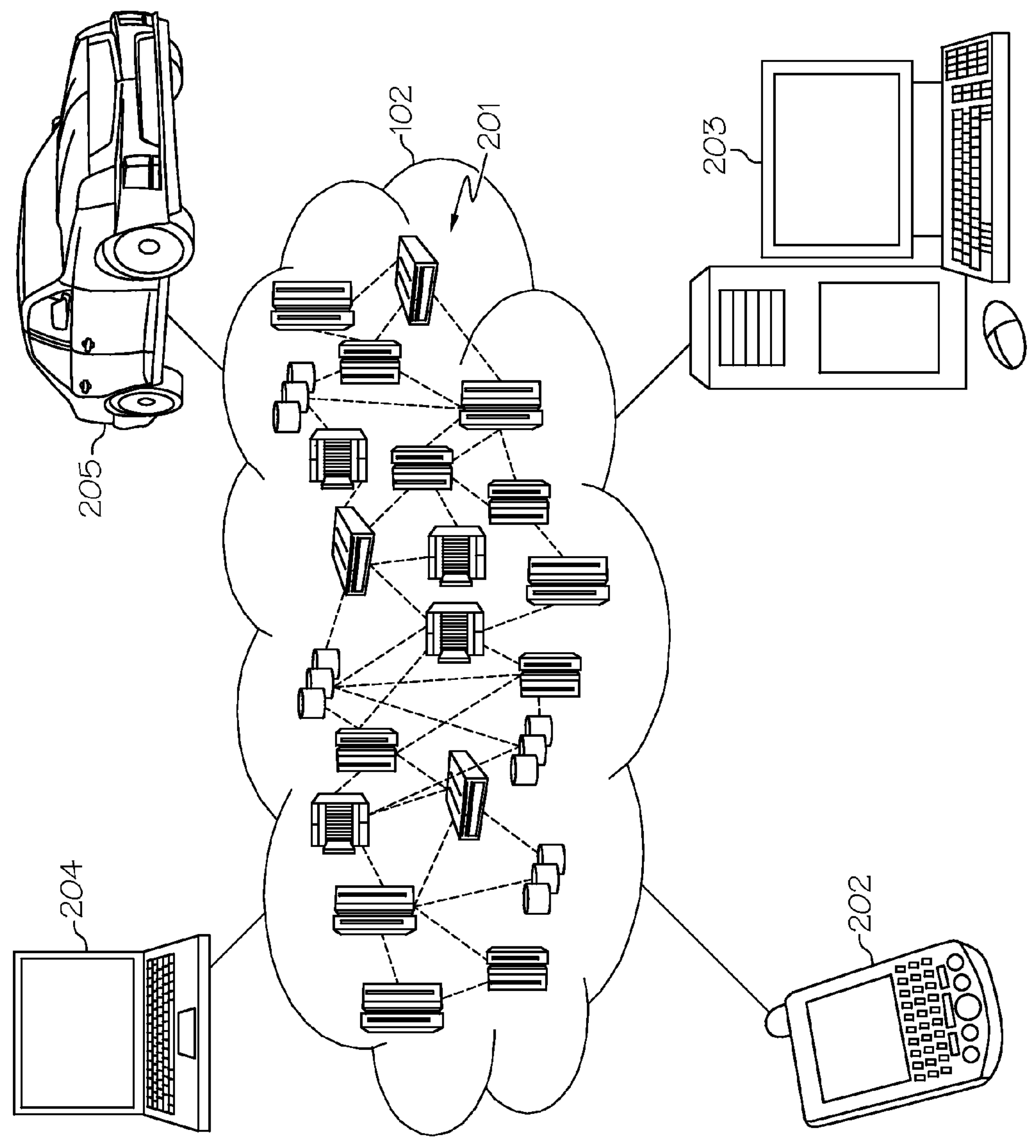
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
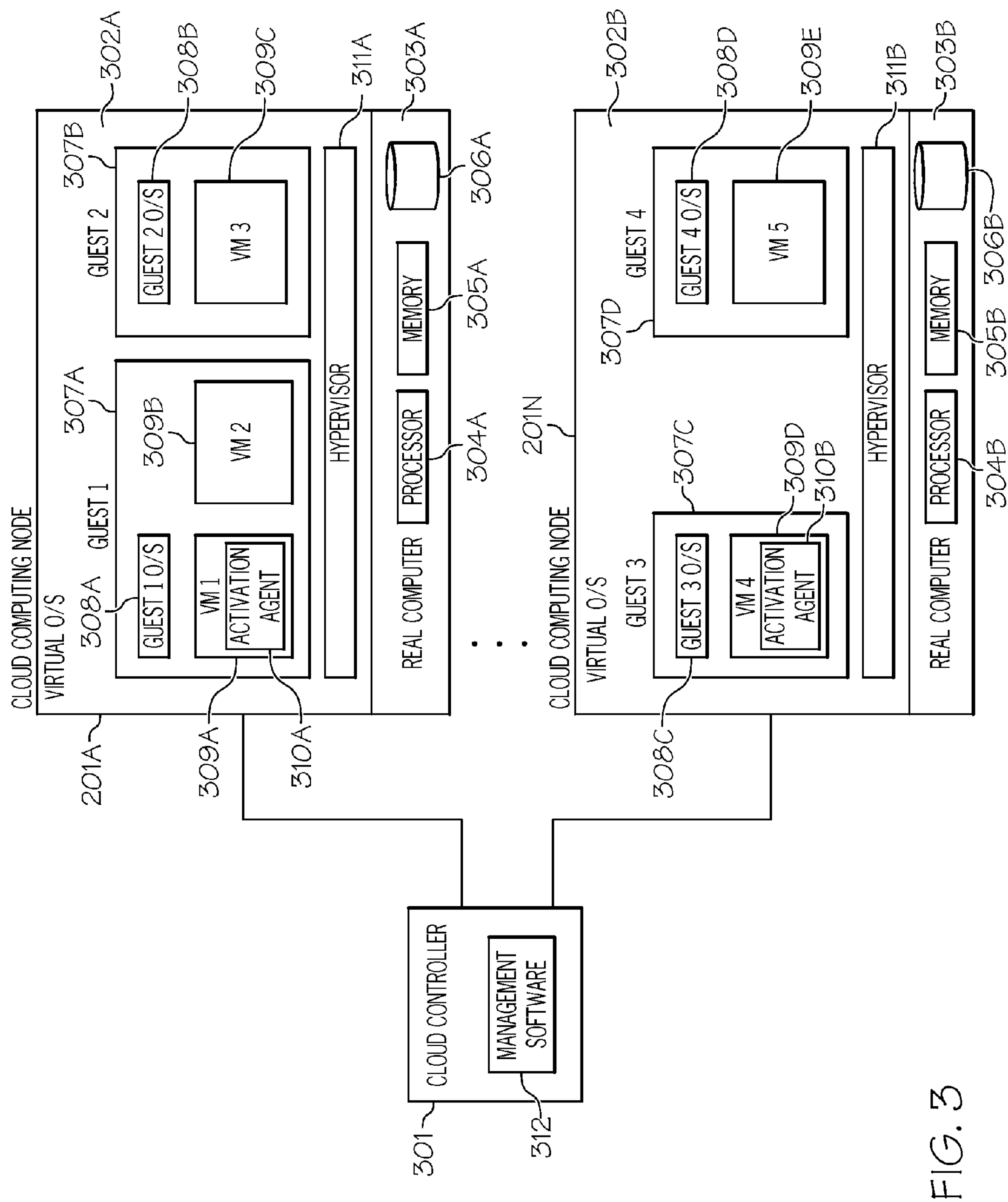
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to a cloud controller 301 configured to provide data center-level functions of communicating with hypervisors on cloud computing nodes 201 to install virtual machines, terminate/suspend virtual machines, relocate virtual machines from one cloud computing node 201 to another within the data center as well as to pre-generate the virtual machine's first-boot metadata (e.g., RSA key) thereby reducing the deployment time of the virtual machine as discussed further below in connection with FIG. 5.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

In one embodiment, an agent 310A, referred to herein as the "activation agent," is run on a virtual machine, such as virtual machine 309A. As discussed further below in connection with FIG. 5, activation agent 310A is configured to request specific metadata from cloud controller 301, such as a virtual machine's first-boot metadata that was generated by cloud controller 301 prior to the deployment of the virtual machine (e.g., virtual machine 309A), instead of having the virtual machine (e.g., virtual machine 309A) generate such metadata at deployment time. In this manner, the deployment time of the virtual machine (e.g., virtual machine 309A) can be reduced.

Virtual operating system 302A further includes a common base portion 311A, referred to herein as a hypervisor. Hypervisor 311A may be implemented in microcode running on processor 304A or it may be implemented in software as part of virtual operating system 302A. Hypervisor 311A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Additionally, activation agent 310B is functionally the same as activation agent 310A. Furthermore, hypervisor 311B is functionally the same as hypervisor 311A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Activation agents 310A-310B may collectively or individually be referred to as activation agents 310 or activation agent 310, respectively. Hypervisors 311A-311B may collectively or individually be referred to as hypervisors 311 or hypervisor 311, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Additionally, activation agent 310 may run on any virtual machine 309 and the depiction of activation agent 310A running on virtual machine 309A and activation agent 310B running on virtual machine 309D is illustrative. Hence, cloud computing node 201 is not to be limited in scope to the elements depicted in FIG. 3.

Referring again to FIG. 3, in some embodiments, cloud controller 301 supports a module, referred to herein as the management software 312, that can be used to manage all the hardware components of cloud computing nodes 201, monitor system utilization, intelligently deploy images of data and optimize the operations of cloud computing environment 102. Furthermore, management software 312 can be used to pre-generate a virtual machine's 309 first-boot metadata (e.g., a RSA key, a Globally Unique IDentifier (GUID), a Secure Sockets Layer (SSL) certificate and a Lightweight Third-Party Authentication (LTPA) key) prior to deployment of virtual machine 309 instead of having virtual machine 309 generate such metadata at deployment time as discussed further below in connection with FIG. 5. A description of the hardware configuration of cloud controller 301 is provided further below in connection with FIG. 4.

Figure 4:
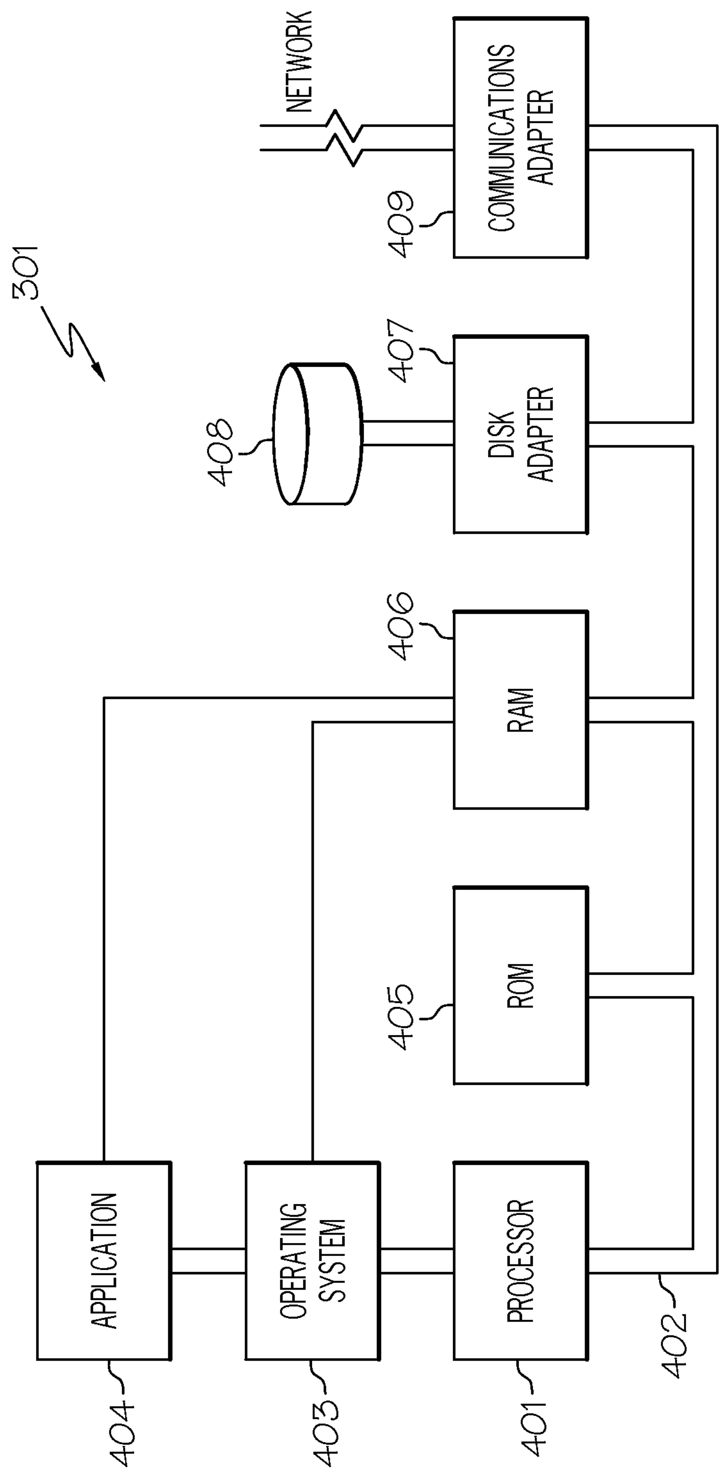
FIG. 4 illustrates a hardware configuration of a cloud controller configured in accordance with an embodiment of the present invention.

Referring now to FIG. 4, FIG. 4 illustrates a hardware configuration of cloud controller 301 (FIG. 3) which is representative of a hardware environment for practicing the present invention. Cloud controller 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 312 of FIG. 3, for pre-generating a virtual machine's 309 first-boot metadata prior to deployment of virtual machine 309 instead of having virtual machine 309 generate such metadata at deployment time as discussed further below in connection with FIG. 5.

Referring again to FIG. 4, read-only memory ("ROM") 405 is coupled to system bus 402 and includes a basic input/output system ("BIOS") that controls certain basic functions of cloud controller 301. Random access memory ("RAM") 406 and disk adapter 407 are also coupled to system bus 402. It should be noted that software components including operating system 403 and application 404 may be loaded into RAM 406, which may be cloud controller's 301 main memory for execution. Disk adapter 407 may be an integrated drive electronics ("IDE") adapter that communicates with a disk unit 408, e.g., disk drive. It is noted that the program for pre-generating a virtual machine's 309 first-boot metadata prior to deployment of virtual machine 309, as discussed further below in connection with FIG. 5, may reside in disk unit 408 or in application 404.

Cloud controller 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, an image of the virtual operating system contains many pieces of unique metadata that are often generated on the first boot to ensure randomness and security, such as a RSA key, a Globally Unique IDentifier (GUID), a Secure Sockets Layer (SSL) certificate and a Lightweight Third-Party Authentication (LTPA) key. Currently, the virtual machine generates these metadata at deployment time. Since some of the metadata requires extensive time to generate, the deployment time of the instance of the virtual machine can be lengthy. If, however, the virtual machine can be relieved of generating such metadata, the deployment time could be lessened. As a result, instead of the cloud's limited resources being used on first-boot activities, such as generating these first-boot metadata, such resources could be used for other activities.

Figure 5:
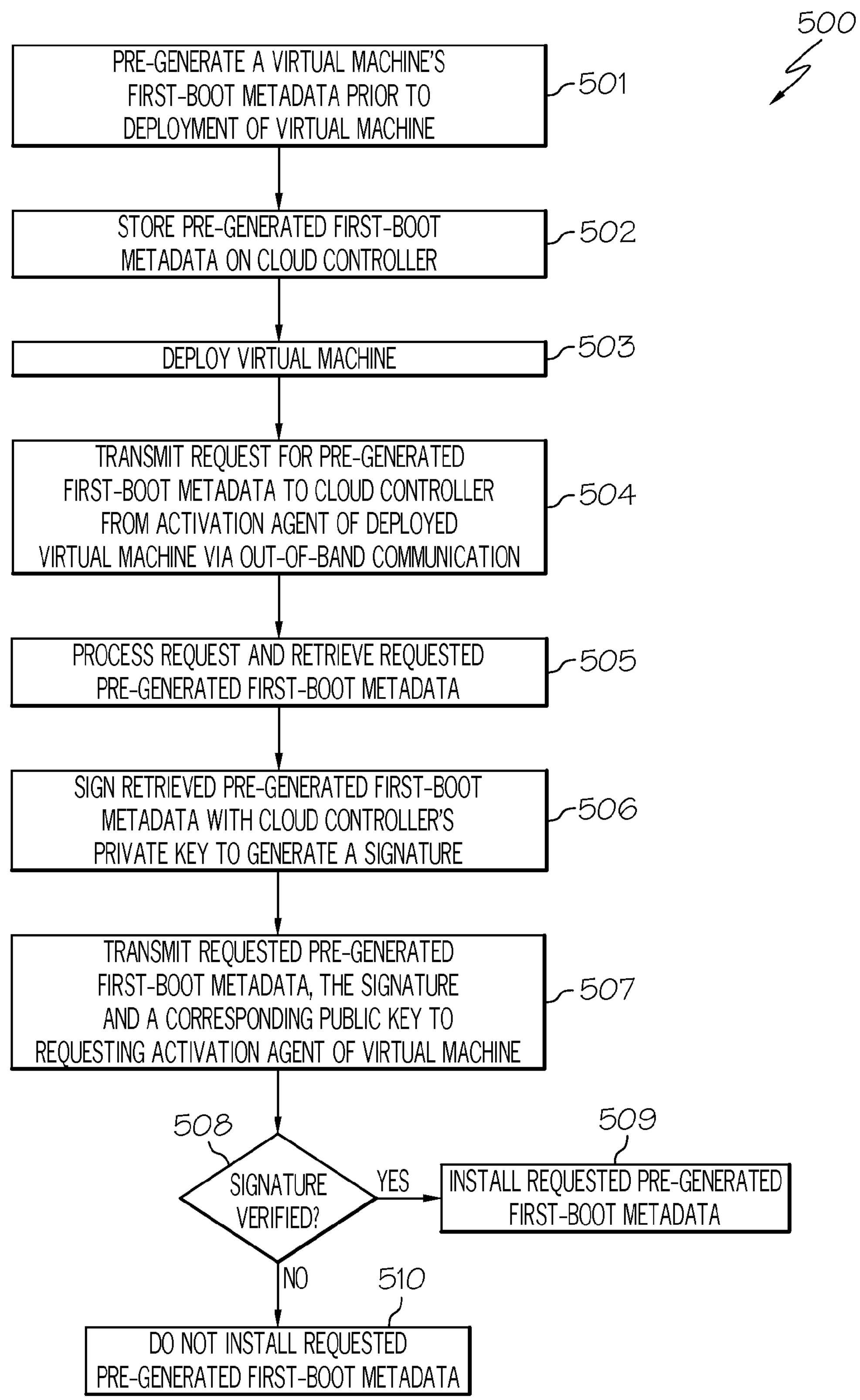
FIG. 5 is a flowchart of a method for optimizing virtual machine deployment in accordance with an embodiment of the present invention.

The principles of the present invention provide a means for reducing the deployment time of virtual machines by having the cloud controller pre-generate a virtual machine's first-boot metadata (e.g., a RSA key, a Globally Unique IDentifier (GUID), a Secure Sockets Layer (SSL) certificate and a Lightweight Third-Party Authentication (LTPA) key) prior to deployment of the virtual machine instead of having the virtual machine generate such metadata at deployment time as discussed further below in connection with FIG. 5.

FIG. 5 is a flowchart of a method 500 for optimizing virtual machine deployment whereby the deployment time for virtual machines 309 (FIG. 3) is reduced thereby freeing up the cloud's resources to be used for other activities in accordance with an embodiment of the present invention.

Referring to FIG. 5, in conjunction with FIGS. 1-4, in step 501, cloud controller 301 pre-generates a virtual machine's 309 first-boot metadata prior to deployment of virtual machine 309. As used herein, a virtual machine's 309 "first-boot metadata" refers to metadata that is generally generated on the first boot by virtual machine 309 to ensure randomness and security, such as a RSA key, a GUID identifier, a SSL certificate and a LTPA key. By having cloud controller 301 pre-generate a virtual machine's 309 first-boot metadata instead of having virtual machine 309 generate such metadata at deployment time, the deployment time for virtual machine 309 is reduced. Furthermore, since cloud controller 301 is generating such metadata instead of virtual machine 309, the metadata may be generate more quickly since cloud controller 301 may have a higher allocation of CPU cores than virtual machine 309 thereby enabling multiple threads to execute concurrently. Additionally, since the deployment time for virtual machine 309 is reduced, cloud resources can be used for other activities.

In step 502, cloud controller 301 stores the pre-generated first-boot metadata, such as in hard drive 408 of cloud controller 301.

In step 503, cloud controller 301 deploys the virtual machine 309. Once virtual machine 309 (e.g., virtual machine 309A) has been deployed and activated, in step 504, activation agent 310 (e.g., activation agent 310A) of the deployed virtual machine 309 (e.g., virtual machine 309A) transmits a request for the pre-generated first-boot metadata to cloud controller 301. In one embodiment, such communications occurs using an out-of-band communication, such as using a REST call. In this manner, the pre-generated metadata may be securely transferred from cloud controller 301 to virtual machine 309 as discussed further below. In one embodiment, the communication may include additional data, such as the hostname, the IP address, location information, application data, etc. of virtual machine 309, which is used by cloud controller 301 to modify/augment the stored pre-generated first-boot metadata to make it usable for virtual machine 309. The first-boot metadata stored by cloud controller 301 may be missing information (e.g., hostname, IP address) that needs to be included in the first-boot metadata in order for it to be used by virtual machine 309. Such information may be provided by activation agent 310 in its request to cloud controller 301 for the pre-generated first-boot metadata.

In step 505, cloud controller 301 processes the request and retrieves the requested pre-generated first-boot metadata, such as from disk unit 408. In one embodiment, the retrieved pre-generated metadata is modified/augmented based on the additional data supplied by activation agent 310.

In step 506, cloud controller 301 signs the retrieved pre-generated first-boot metadata with cloud controller's 301 private key to generate a signature thereby allowing virtual machine 309 to validate the authenticity and integrity of the pre-generated first-boot metadata as discussed further below.

In step 507, cloud controller 301 transmits the requested pre-generated first-boot metadata, the signature and a public key (public key that is corresponding to the private key used by cloud controller 301 in step 506) to the requesting activation agent 310 of virtual machine 309. In one embodiment, only a single instance of the generated first-boot metadata is ever stored and used by cloud controller 301. Hence, when cloud controller 301 transmits the requested pre-generated first-boot metadata, there are no stored copies of the transmitted pre-generated first-boot metadata remaining in cloud controller 301 thereby preventing it from being used again by another virtual machine 309 for security purposes.

In step 508, virtual machine 309 determines whether the signature is verified using the received public key. If the signature is verified by the public key, then, in step 509, virtual machine 309 installs the requested pre-generated first-boot metadata. Otherwise, if the signature is not verified by the public key, then, in step 510, virtual machine 309 does not install the requested pre-generated first-boot metadata.

While the foregoing discusses the use of public-key cryptography for authenticating the requesting pre-generated first-boot metadata, other cryptographic systems may be used for authenticating the requesting pre-generated first-boot metadata. Embodiments employing such cryptographic systems fall within the scope of the present invention.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing virtual machine deployment, the method comprising:

pre-generating a virtual machine's first-boot metadata prior to deployment of said virtual machine;

wherein the virtual machine's first-boot metadata is pre-generated on first boot of said virtual machine contributing to security;

storing said pre-generated first-boot metadata;

deploying said virtual machine;

receiving a request from an agent, executing on said virtual machine, requesting said pre-generated first-boot metadata;

retrieving said requested pre-generated first-boot metadata;

signing said retrieved pre-generated first-boot metadata with a private key to generate a signature;

and transmitting, by a processor, a public key, said signature and said retrieved pre-generated first-boot metadata to said agent of said virtual machine.

2. The method as recited in claim 1, wherein said request from said agent of said virtual machine is received via an out-of-band communication.

3. The method as recited in claim 1 further comprising: verifying said signature using said public key.

4. The method as recited in claim 3 further comprising: installing said retrieved pre-generated first-boot metadata in response to verification of said signature.

5. The method as recited in claim 1, wherein said first-boot metadata comprises one of the following: an RSA key, a Globally Unique IDentifier (GUID), a Secure Sockets Layer (SSL) certificate and a Lightweight Third-Party Authentication (LTPA) key.

6. A computer program product embodied in a non-transitory computer readable storage medium for optimizing virtual machine deployment, the computer program product comprising the programming instructions for:

pre-generating a virtual machine's first-boot metadata prior to deployment of said virtual machine;

wherein the virtual machine's first-boot metadata is pre-generated on first boot of said virtual machine contributing to security;

storing said pre-generated first-boot metadata; deploying said virtual machine;

receiving a request from an agent, executing on said virtual machine, requesting said pre-generated first-boot metadata;

retrieving said requested pre-generated first-boot metadata;

signing said retrieved pre-generated first-boot metadata with a private key to generate a signature;

and transmitting a public key, said signature and said retrieved pre-generated first-boot metadata to said agent of said virtual machine.

7. The computer program product as recited in claim 6, wherein said request from said agent of said virtual machine is received via an out-of-band communication.

8. The computer program product as recited in claim 6, wherein said signature is verified using said public key.

9. The computer program product as recited in claim 8, wherein said virtual machine installs said retrieved pre-generated first-boot metadata in response to verification of said signature.

10. The computer program product as recited in claim 6, wherein said first-boot metadata comprises one of the following: an RSA key, a Globally Unique IDentifier (GUID), a Secure Sockets Layer (SSL) certificate and a Lightweight Third-Party Authentication (LTPA) key.

11. A system, comprising:

a memory unit for storing a computer program for optimizing virtual machine deployment; and a processor coupled to said memory unit, wherein said processor, responsive to said computer program, comprises:

circuitry for pre-generating a virtual machine's first-boot metadata prior to deployment of said virtual machine; wherein the virtual machine's first-boot metadata is pre-generated on first boot of said virtual machine contributing to security;

circuitry for storing said pre-generated first-boot metadata; circuitry for deploying said virtual machine;

circuitry for receiving a request from an agent, executing on said virtual machine, requesting said pre-generated first-boot metadata;

circuitry for retrieving said requested pre-generated first-boot metadata;

circuitry for signing said retrieved pre-generated first-boot metadata with a private key to generate a signature; and circuitry for transmitting a public key, said signature and said retrieved pre-generated first-boot metadata to said agent of said virtual machine.

12. The system as recited in claim 11, wherein said request from said agent of said virtual machine is received via an out-of-band communication.

13. The system as recited in claim 11, wherein said signature is verified using said public key.

14. The system as recited in claim 13, wherein said virtual machine installs said retrieved pre-generated first-boot metadata in response to verification of said signature.

15. The system as recited in claim 11, wherein said first-boot metadata comprises one of the following: an RSA key, a Globally Unique IDentifier (GUID), a Secure Sockets Layer (SSL) certificate and a Lightweight Third-Party Authentication (LTPA) key.

* * * * *